United States Patent [19]

Sim

[11] Patent Number: 5,744,260

[45] Date of Patent: Apr. 28, 1998

[54] BATTERY PACK

[75] Inventor: Jae-Hoon Sim, Seoul, Rep. of Korea

[73] Assignee: Daewoo Electronics Co., Ltd., Seoul, Japan

[21] Appl. No.: 686,352

[22] Filed: Jul. 25, 1996

[51] Int. Cl.$^6$ ............................................. H01M 6/42

[52] U.S. Cl. .............................. 429/99; 429/100; 429/159

[58] Field of Search ........................... 429/96, 99, 100, 429/159

[56]        References Cited

U.S. PATENT DOCUMENTS

| | | | |
|---|---|---|---|
| 4,965,148 | 10/1990 | Daio et al. | 429/159 |
| 4,997,731 | 3/1991 | Machida et al. | 429/90 |

*Primary Examiner*—M. Nuzzolillo

[57]           ABSTRACT

A battery pack is disclosed, in which terminal members can be fixed to cases, and the entire volume of which can be reduced. The battery pack has a pair of battery cells electrically connected in series to each other. A pair of cases receives the battery cells and each case includes a lid, a cell receiving portion, and a connecting portion. A pair of terminal members is connected to the positive and negative electrodes of the battery cells and is fixed to a case in such a way that they are externally exposed. According to the battery pack, as the battery cells are received so that they are exposed outside the cases, its total volume can be reduced. Further, the terminal members can be easily fixed to the cases.

9 Claims, 8 Drawing Sheets

BATTERY PACK

BACKGROUND OF THE INVENTION

1. Field of the Invention

The present invention relates to a battery pack, and more particularly to a battery pack which can be used as an electric power source for a portable device, especially as an electric power source for a camera.

2. Prior Art

An example of a battery pack used as an electric power source for a portable device such as a camera, a portable video camera, or the like is disclosed in Japanese Utility Model Laid-Open Publication No. 61-38861. The battery pack includes a pair of cases engaged with each other, thus forming an inner space, a pair of battery cells which is provided in the space formed by the cases and electrically connected to each other, and two terminal members exposed outside the cases, the ends of which are respectively connected to the positive and negative electrodes of the battery cells.

In the above battery pack, the terminal members are exposed on both cross sectional and side surfaces of the cases so that the terminal members are easily connected to the device. Also, the deformation of the terminal members by an external impact is solved by forming, supporting plates within openings of the battery pack.

However, the ends of terminal members are not sufficiently inserted into the recesses formed at the inner sides of the openings, so the terminal members may be in a loose and/or mismatching state. Further, when the other ends of the terminal members are electrically connected to the electrodes of the battery cells by welding, because of the response to the welding, pressure, the terminal members become higher than the recesses. Thus, the appearance of the battery pack is poor.

A battery pack which can overcome the above-mentioned disadvantages is disclosed in Japanese Utility Model Publication No. 5-35562.

A battery pack 10 of the above publication, as shown in FIGS. 1 through 3, includes a pair of battery cells 12 which are electrically connected in series to each other, a pair of terminal members 16 respectively connected to positive and negative electrodes 14 of battery cells 12, a pair of cases 18 and 20 which form a space for receiving battery cells 12, and to which terminal members 16 are fixed.

As shown in FIGS. 1, 3, and 4, terminal members 16 penetrate openings 22 formed at the side surface of the upper portion of a case 18 and are supported by reverse L-shaped supports 24 which are formed at the upper portion of case 18. Further, terminal members 16 are fixed to the cases 18 and 20 by engaging case 18 with case 20. According to the above Japanese Utility Model Publication, the ends of terminal members 16 are supported by the reverse L-shaped supports 24 formed from the side to the ends of case 18 and 20, and are fixed to cases 18 and 20 by inserting the other ends of terminal members 16 into the recesses formed on the inner side of the cross section of case 20.

However, in the above battery pack 10, since terminal members 16 are fixed to cases 18 and 20 only through the engagement of cases 18 and 20, great attention is necessary during the assembling process. In addition, since the battery cells 12 are enclosed within the inner space formed by cases 18 and 20, the volume of the battery pack 10 is much greater than the total volume of battery cells 12.

In U.S. Pat. No. 4,997,731 issued to Machida et. al. on Mar. 5, 1991, a battery pack wherein the cases and lids are manufactured separately is disclosed. According, to the battery pack of Machida et al., the battery cells are placed in the space formed by a pair of cases and are electrically connected to each other by using a connecting piece. Then, the end openings of the cases are closed after the terminal members are fixed to the positive and negative electrodes of the battery cells. However, according to the battery pack of Machida et al., since the cases and lids are manufactured separately, a lot of manufacturing steps are needed. In addition, since the battery cells are placed on the lower lid, they might be released from the battery pack by an unintentional separation of the lower lid from the cases.

SUMMARY OF THE INVENTION

Therefore, it is an object of the present invention to provide a battery pack having a small volume which may be easily manufactured.

To accomplish the object of the present invention, the present invention provides a battery pack comprising:

a first case including a first lid, a first cell receiving portion for receiving and supporting a first and second battery cells, and a first connecting portion for connecting the first cell receiving portion with the first lid, wherein the first and second battery cells are arranged physically in parallel and connected electrically in series to each other, the first lid includes a pair of first apertures formed at the upper surface thereof, a pair of fixing, portions formed at a sidewall thereof, and a pair of terminal member supporting portions which have recesses for connecting the first apertures with the fixing portions, and the first lid, the first cell receiving portion, and the first connecting portion are integrally formed;

a second case including a second lid en-aged with the first lid, a second cell receiving portion for receiving and supporting the first and second battery cells by engagement with the first cell receiving portion, and a second connecting portion for connecting the second cell receiving portion with the second lid, wherein the second lid, the second cell receiving portion, and the second connecting portion are integrally formed; and first and second terminal members each having a connecting end which is inserted through one of the first apertures to be electrically connected to one of the electrodes of the first and second battery cells, and a fixing end which is inserted through one of the fixing portions to be fixed to the first case, wherein the first and second terminal members are located on the terminal member supporting portions.

According to the present invention, the first and second battery cells are electrically connected in series to each other through a connecting piece. The fixing ends of the first and second terminal members are inserted through the second apertures of the first lid to be fixed at the inner surface of the first lid, and the connecting ends are inserted through the first apertures.

Then, the first and second battery cells, which are electrically connected in series to each other by the connecting piece, are placed on the first cell receiving portion of the first case. The second case is engaged with the first case after the connecting ends of the first and second terminal members are fixed to the respective electrodes of the battery cells by welding or the like.

According to the present invention, the terminal members can be easily fixed to the cases. Further, the entire volume of a battery pack can be reduced by eliminating unnecessary parts of the cases.

BRIEF DESCRIPTION OF THE DRAWINGS

The above object and other advantages of the present invention will become more apparent by describing in detail preferred embodiments thereof with reference to the attached drawings in which.

DETAILED DESCRIPTION OF THE PREFERRED EMBODIMENTS

Figure 1:
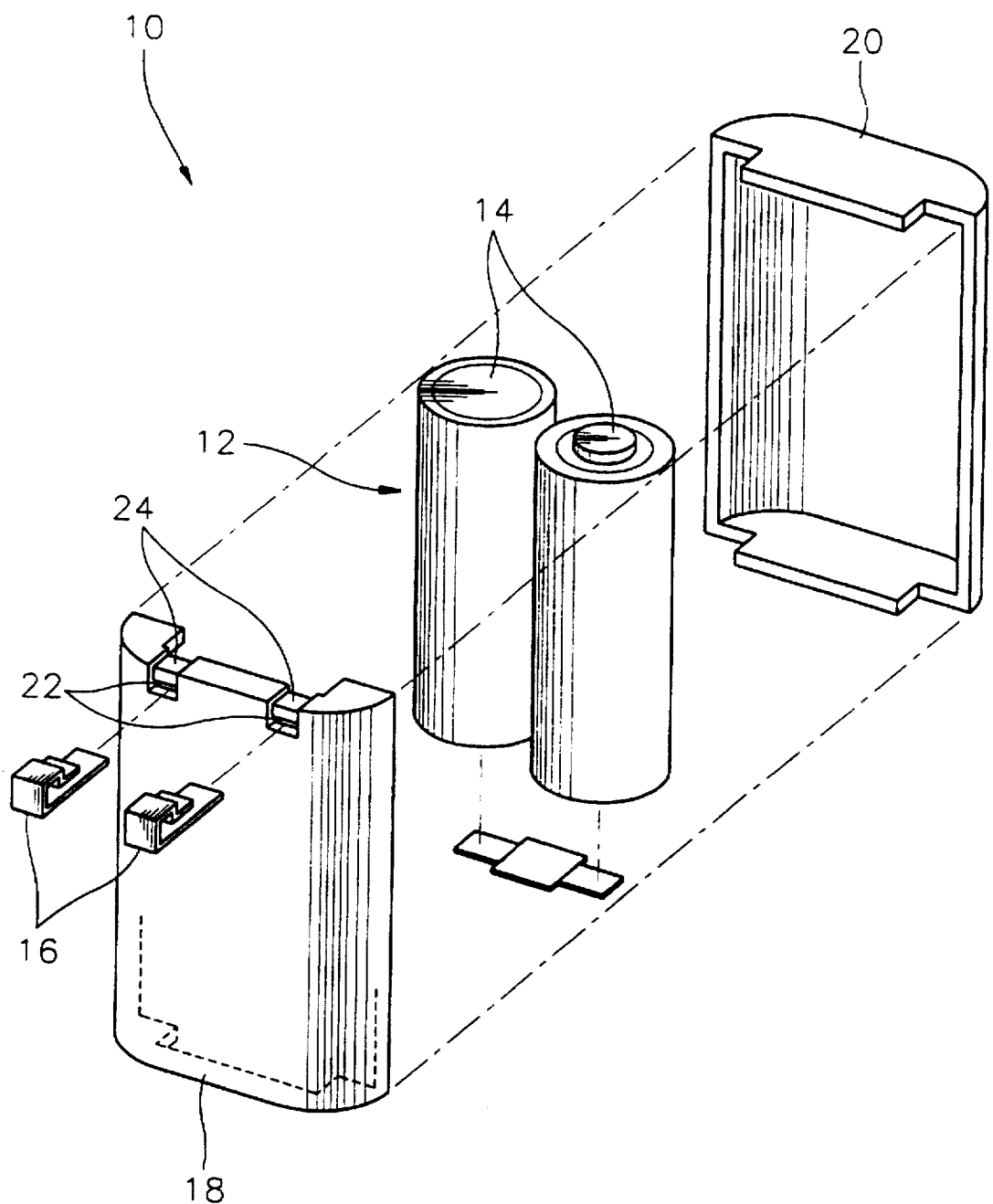
FIG. 1 is an exploded perspective view of a conventional battery pack.
Figure 2:
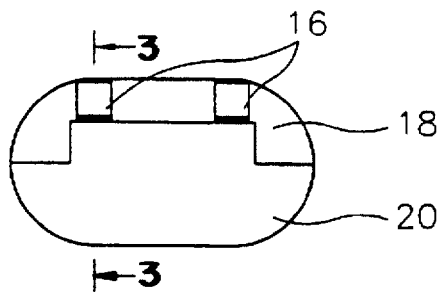
FIG. 2 is a plan view of the battery pack as shown in FIG. 1.
Figure 3:
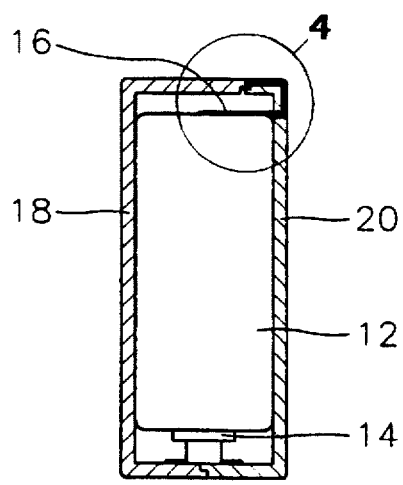
FIG. 3 is a cross sectional view taken along the line 3—3 in FIG. 2.
Figure 4:
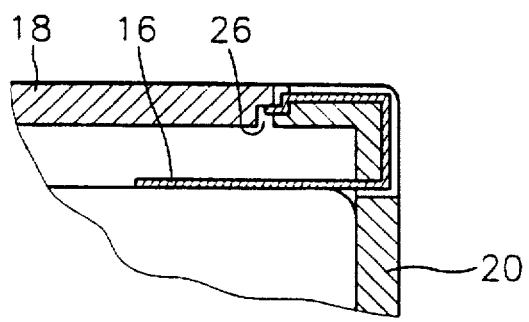
FIG. 4 is an enlarged cross sectional view of the portion 4 in FIG. 3.

Hereinafter, preferred embodiments of the present invention will be described in detail with reference to accompanying drawings in which the same reference numerals represent the same elements.

Embodiment 1

FIGS. 5 to 8 show a battery pack 100 according to a first embodiment of the present invention.

Figure 5:
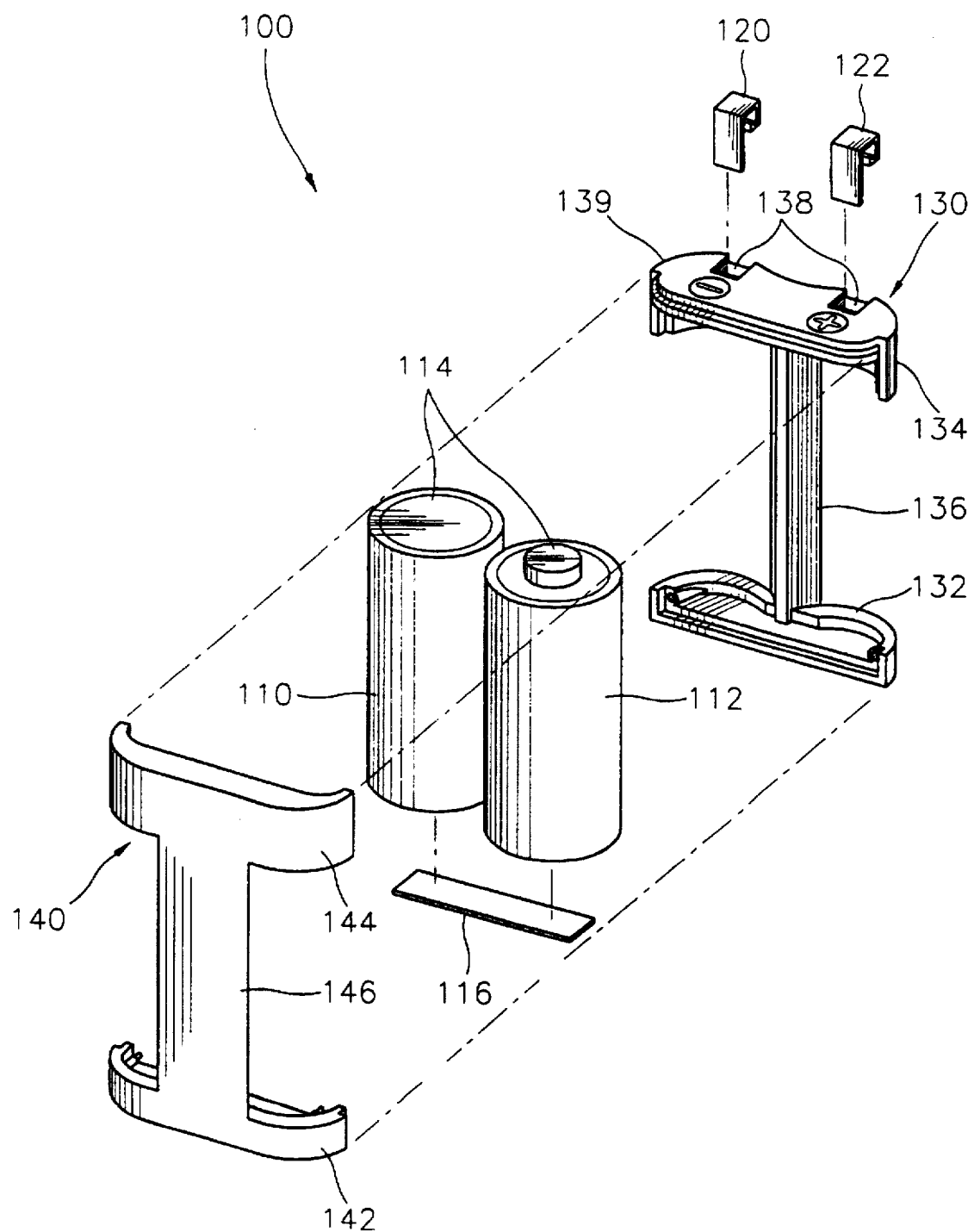
FIG. 5 is an exploded perspective view of the battery pack according to the first embodiment of the present invention.

As shown in FIG. 5, a battery pack 100 of the present embodiment includes first and second battery cells 110 and 112 which are arranged in parallel and electrically connected in series to each other, first and second terminal members 120, and 122 electrically connected to electrodes 114 of first and second battery cells 110 and 112 respectively, a first case 130, to which first and second terminal members 120 and 122 are integrally fixed, and a second case 140 which is integrally formed and is engaged with first case 130, thus receiving first and second battery cells 110 and 112.

As shown in FIG. 5, first and second battery cells 110 and 112 are arranged physically in parallel so that the opposite electrodes of first and second battery cells 110 and 112 are side by side and vice versa, and the electrodes are electrically connected in series to each other. For example, the positive electrode of first battery cell 110 is electrically connected in series to the negative electrode of second battery cell 112 by a connecting piece 116 and vice versa.

First and second terminal members 120 and 122, which have a U-like shape as shown in FIG. 5 include connecting ends 121 and 123 respectively connected to the electrodes of first and second battery cells 110 and 112, and further includes fixing ends 124 and 125 fixed to first case 130.

Figure 7:
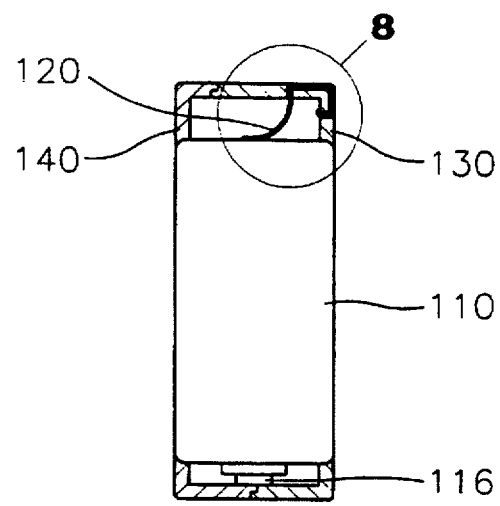
FIG. 7 is a cross sectional view taken along the line 7—7 in FIG. 6.
Figure 8:
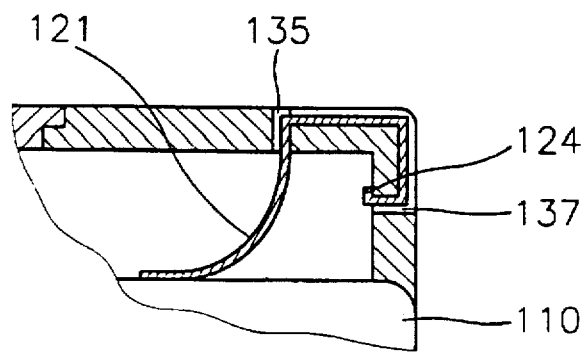
FIG. 8 is an enlarged cross sectional view of the portion 8 in FIG. 7.

Fixing, ends 124 and 125 are folded several times, thus having a U-like shape, as shown in FIGS. 7 and 8.

Figure 6:
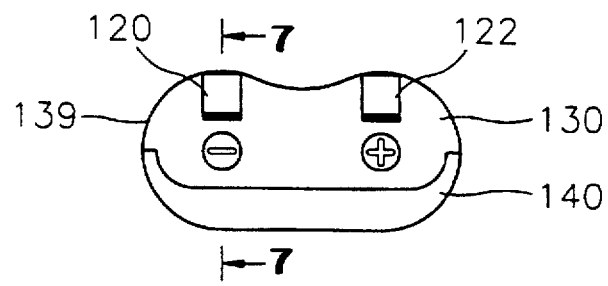
FIG. 6 is a plan view of the battery pack as shown in FIG. 5.

First case 130 having a W-like planar shape as shown in FIG. 6, includes a first cell receiving portion 132 for receiving and supporting first and second battery cells 110 and 112, a first lid 134 to which first and second terminal members 120 and 122 are fixed, and a first connecting portion 136 for connecting first cell receiving portion 132 with first lid 134.

First and second pairs of apertures 135 and 137 are formed on the side and upper surfaces of first lid 134, respectively. Terminal member supporting portions 138 have recess shapes and they are formed so as to connect first aperture 135 of the upper surface to second aperture 137 of the side surface.

Fixing ends 124 and 125 of first and second terminal members 120 and 122 are fixedly inserted to second apertures 137, and connecting ends 121 and 123 of first and second terminal members 120 and 122 are inserted to first apertures 135 to be connected with the positive and negative electrodes of first and second battery cells 110 and 112. Thus, first and second terminal members 120 and 122 are placed on terminal member supporting portions 138.

First lid 134 is formed so that the radius of the curvature of arcuate portions 139 thereof is equal to the radius of first and second battery cells 110 and 112. Also, first cell receiving portion 132 is formed so that the radius of the curvature of arcuate portions thereof is equal to the radius of first and second battery cells 110 and 112. First connecting portion 136 is formed so that the radius of curvature of outer surface thereof is equal to that of the concaved portion between terminal member supporting portions 138 of first lid 134.

Second case 140 includes a second cell receiving portion 142 for receiving and supporting first and second battery cells 110 and 112 by engagement with first cell receiving portion 132, a second lid 144 engaged with first lid 134, and a second connecting portion 146 for connecting second cell receiving portion 142 with second lid 144. Arcuate portions 139 of second lid 144 are formed so that the curvature of the arcuate portions 139 is equal to that of first and second battery cells 110 and 112. Also, arcuate portions of second cell receiving portion 142 are formed so that the curvature of the arcuate portions is equal to that of first and second battery cells 110 and 1 12. Second connecting portion 146 is formed so that the outer surface thereof is a plane, and so that it covers the concaved portion between first and second battery cells 110 and 112.

Therefore, battery pack 100 of the present embodiment has a plan view as shown in FIG. 6.

A procedure of assembly of battery pack 100 of the present embodiment is as follows.

First and second battery cells 110 and 112 are arranged physically in parallel so that the opposite electrodes 114 thereof are side by side, and then are connected in series to each other through connecting piece 116. Fixing, ends 124 and 125 of first and second terminal members 120 and 122 are inserted through second apertures 137 of first lid 134 and then are bent toward the inner surface of first lid 134 so that they are fixed, and connecting ends 121 and 123 are inserted through first apertures 135.

Then, first and second battery cells 110 and 112 which are connected in series to each other by connecting piece 116 are placed on first cell receiving portion 132. First and second cases 130 and 140 are engaged with each other after connecting, ends 121 and 123 of first and second terminal members 120 and 122 are fixed to first and second electrodes 114 of battery cells 110 and 112 by welding or the like.

Therefore, the outer surfaces of battery cells 110 and 112 received in the cases 130 and 140 are externally exposed.

Embodiment 2

FIGS. 9 to 12 show a battery pack 200 according to a second embodiment of the present invention.

Figure 9:
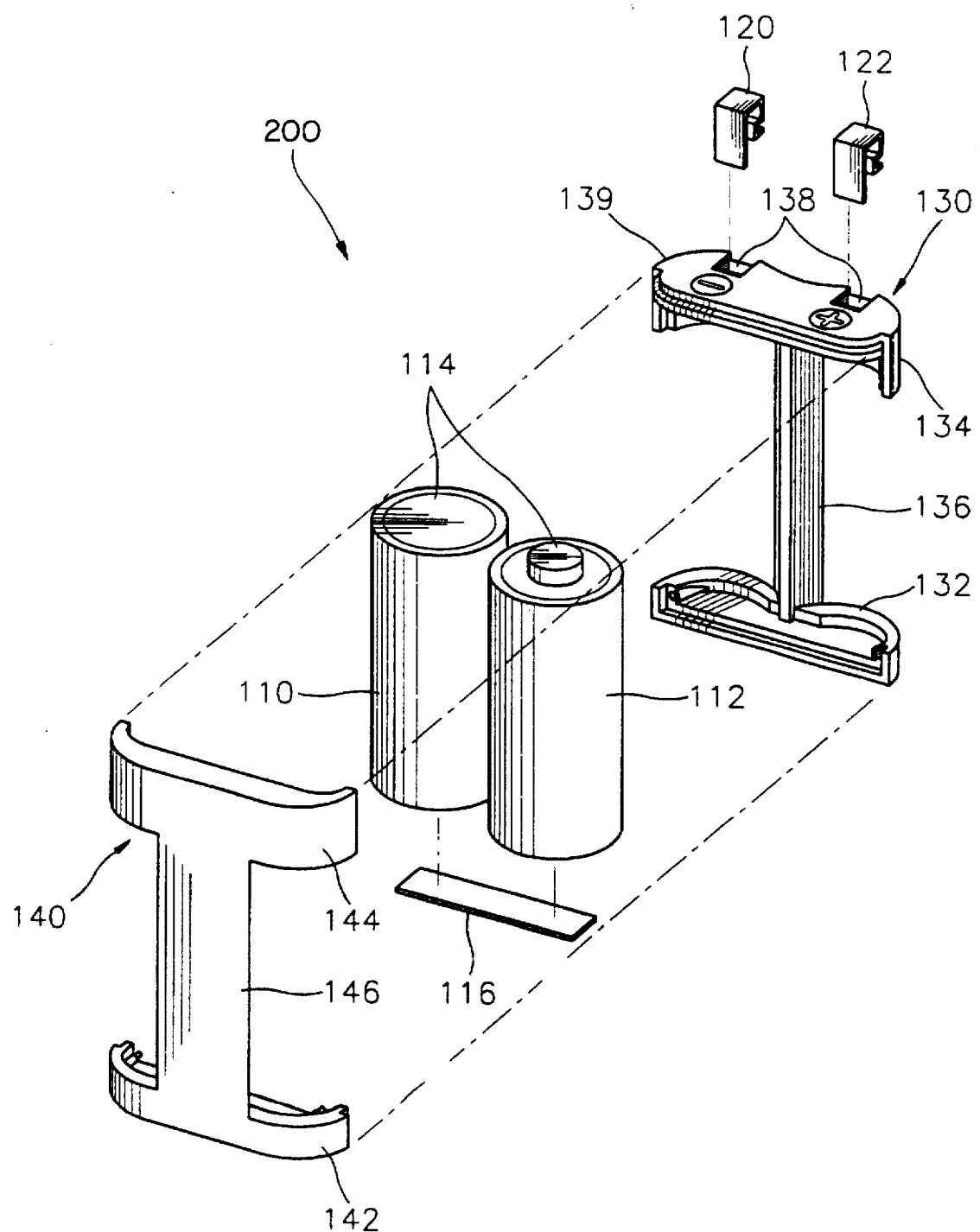
FIG. 9 is an exploded perspective view of the battery pack according to the second embodiment of the present invention.

As shown in FIG. 9, a battery pack 200 according to the present embodiment includes the same elements of battery pack 100 according to the first embodiment, except the differences in first and second terminal members 120 and 122, and first case 130. Thus, in the present embodiment, battery pack 200 is described only with respect to first and second terminal members 120 and 122, and first case 130.

First and second terminal members 120 and 122, which have a U-like shape as shown in FIG. 9, include connecting ends 121 and 123 which are respectively connected to the electrodes of first and second battery cells 110 and 112 and to fixing ends 124 and 125 fixed to first case 130. Fixing, ends 124 and 125 are bent inwardly and then outwardly so that first and second terminal members 120 and 122 are fixed to first case 130.

Figure 10:
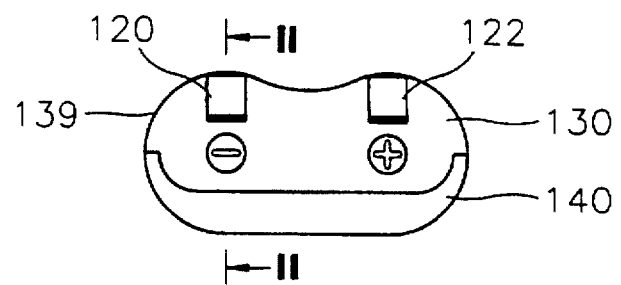
FIG. 10 is a plan view of the battery pack as shown in FIG. 9.
Figure 11:
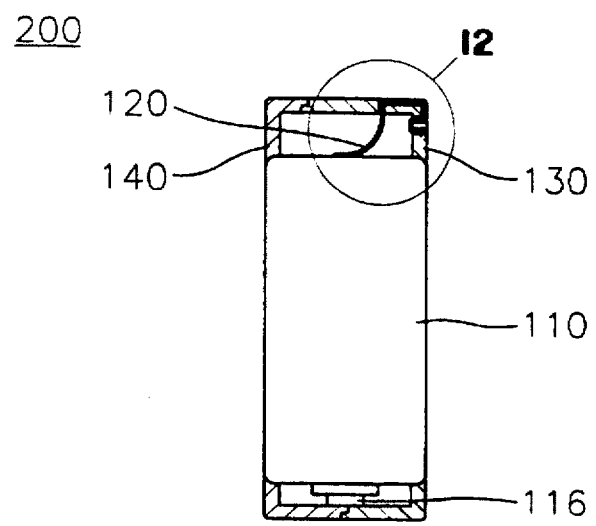
FIG. 11 is a cross sectional view taken along the line 11—11 in FIG. 10.
Figure 12:
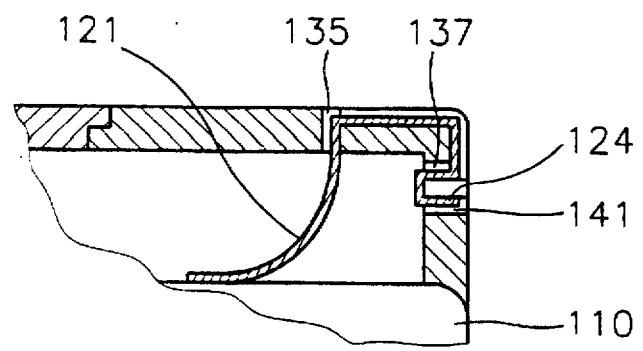
FIG. 12 is an enlarged cross sectional view of part 12 in FIG. 11

First case 130 having a W-like planar shape as shown in FIG. 10 includes a first cell receiving portion 132 for receiving and supporting first and second battery cells 1 10 and 112, a first lid 134, to which first and second terminal members 120 and 122 are fixed, and a first connecting portion 136 for connecting first cell receiving portion 132 with first lid 134.

First apertures 135 are formed on the upper surface of first lid 134, and second and third apertures 137 and 141 are formed on the side surface of first lid 134. Third apertures 141 are positioned at the lower portion of first lid 134, i.e. below second apertures 137. Terminal member supporting portions 138 are recesses and are formed so as to connect first apertures 135 formed at the upper surface of first lid 134 to second apertures 137 formed at the outer side of first lid 134.

Fixing ends 124 and 125 of first and second terminal members 120 and 122 are inserted via second apertures 137 into third apertures 141, and connecting ends 121 and 123 of first and second terminal members 120 and 122 are inserted into first apertures 135 so that they are connected with the positive and negative electrodes of first and second battery cells 110 and 112. Thus, first and second terminal members 120 and 122 are placed on terminal member supporting portions 138.

First lid 134 is formed so that the radius of curvature of arcuate portions 139 thereof is equal to the radius of first and second battery cells 110 and 112. First connecting portion 136 is formed so that the radius of the curvature of the outer surface thereof is equal to that of the concaved portion between terminal member supporting portions 138 of first lid 134.

A procedure of assembly of battery pack 200 of the present embodiment is as follows.

First and second battery cells 110 and 112 are arranged physically in parallel so that opposite electrodes 114 thereof are side by side, and then are connected in series to each other through connecting piece 116. Fixing, ends 124 and 125 of first and second terminal members 120 and 122 are inserted into third apertures 141 via second apertures 137 of first lid 134 so that they are fixed to first lid 134, and connecting ends 121 and 123 are inserted through first apertures 135.

Then, first and second battery cells 110 and 112 which are connected by connecting piece 116, are placed on first cell receiving portion 132. After connecting ends 121 and 123 of first and second terminal members 120 and 122 are fixed to first and second electrodes 114 of battery cells 110 and 112 by welding or the like, first and second cases 130 and 140 are engaged with each other.

Embodiment 3

FIGS. 13 to 16 show a battery pack 300 according to a third embodiment of the present invention.

Figure 13:
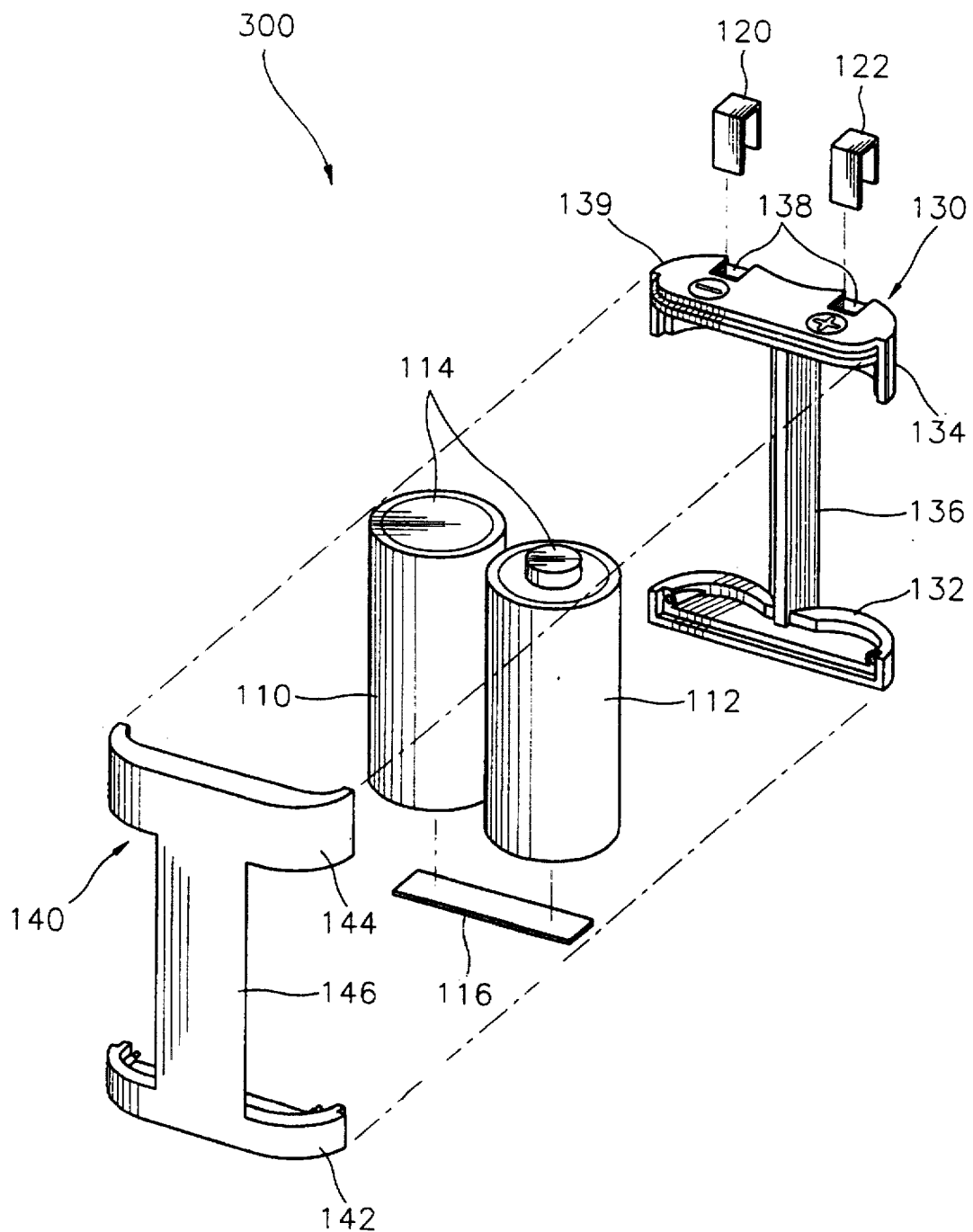
FIG. 13 is an exploded perspective view of the battery pack of the third embodiment of the present invention.

As shown in FIG. 13, a battery pack 300 according to the present embodiment includes the same elements of battery packs 100 and 200 according to the first and second embodiments except for differences in first and second terminal members 120 and 122, and first case 130. Thus, in the present embodiment, battery pack 300 is described only with respect to first and second terminal members 120 and 122, and first case 130.

First and second terminal members 120 and 122, which have a U-like shape as shown in FIG. 13, include connecting ends 121 and 123 respectively connected to the electrodes of first and second battery cells 110 and 112, and fixing ends 124 and 125 fixed to first case 130.

Figure 14:
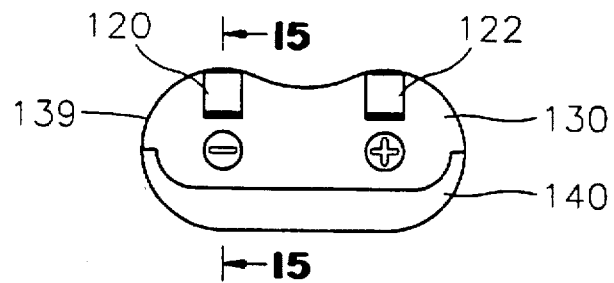
FIG. 14 is a plan view of the battery pack as shown in FIG. 13.
Figure 15:
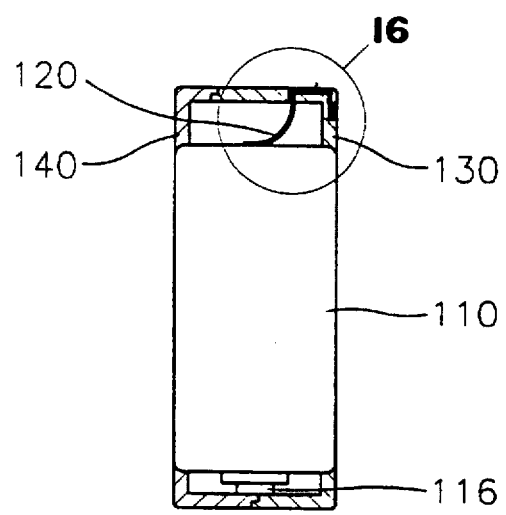
FIG. 15 is a cross sectional view taken along the line 15—15 in FIG. 14.
Figure 16:
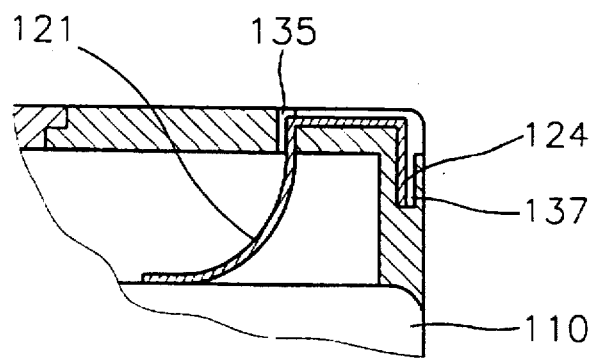
FIG. 16 is an enlarged cross sectional view of a portion 16 in FIG. 15.

First case 130, having a W-like planar shape as shown in FIG. 14, includes a first cell receiving portion 132 for receiving and supporting first and second battery cells 110 and 112, a first lid 134, to which first and second terminal members 120 and 122 are fixed, and a first connecting portion 136 for connecting first cell receiving portion 132 with first lid 134.

First apertures 135 are formed at the upper surface of first lid 134, and fixing, recesses 142 are vertically formed on the side surface of first lid 134. Terminal member supporting portions 138 are recesses and are formed so as to connect first apertures 135 to fixing, recesses 142.

Fixing ends 124 and 125 of first and second terminal members 120 and 122 are inserted into fixing recesses 142, and connecting ends 121 and 123 thereof are inserted into first apertures 135 so that they are connected with the positive and negative electrodes of first and second battery cells 110 and 112. Thus, first and second terminal members 120 and 122 are placed on terminal member supporting portions 138.

A procedure of assembly of battery pack 300 of the present embodiment is as follows.

First and second battery cells 110 and 112 are arranged physically in parallel so that opposite electrodes 114 thereof are side by side, and then are connected in series to each other by connecting piece 116. Fixing ends 124 and 125 of first and second terminal members 120 and 122 are inserted into fixing recesses 142 so that they are fixed to first lid 134, and connecting ends 121 and 123 are inserted into first apertures 135.

Then, first and second battery cells 110 and 112 connected by connecting piece 116 are placed on first cell receiving portion 132. First and second cases 130 and 140 are engaged with each other after connecting ends 121 and 123 of first and second terminal members 120 and 122 are fixed to first and second electrodes 114 of battery cells 110 and 112 by welding or the like.

As described in the above embodiments, in the battery pack according to the present invention, the terminal members are fixed to the cases firmly and easily, and the volume of the battery pack can be reduced by removing unnecessary portions (that is, the side surface portions of the cases) of the conventional battery pack.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A battery pack comprising:
    a first case including a first lid, a first cell receiving portion for receiving and supporting first and second battery cells, and a first connecting portion for connecting the first cell receiving portion with said first lid, wherein said first and second battery cells are arranged physically in parallel and connected electrically in series to each other, said first lid includes a pair of first apertures formed at an upper surface thereof, a pair of second apertures formed at a side surface of said first lid, and a pair of terminal member supporting portions having recesses for connecting the first apertures with the second recesses, and said first lid, the first cell receiving portion, and the first connecting portion are integrally formed,
    a second case including a second lid engaged with said first lid, a second cell receiving portion for receiving and supporting said first and second battery cells by engagement with the first cell receiving portion, and a second connecting portion for connecting the second cell receiving portion with said second lid, wherein said second lid, the second cell receiving portion, and the second connecting portion are integrally formed; and
    first and second terminal members each having a connecting end inserted through one of the first apertures to be electrically connected with one of electrodes of said first and second battery cells, and a fixing end inserted through one of the second apertures, wherein the fixing ends of said first and second terminal members are bent toward an inner side of said first case to be fixed to said first case, and said first and second terminal members are located on the terminal member supporting portions.

2. A battery pack according to claim 1, wherein said first case has a planar W-like shape, said first and second cases cover a space between said first and second battery cells and expose outer side surface portions of said first and second battery cells.

3. A battery pack according to claim 1, wherein radii of a curvature of arcuate portions of said first lid and the first cell receiving portions is equal to a radius of said first and second battery cells, outside and inside surfaces of the first connecting portion being concaved and convexed respectively, and outside and inside of the second connecting portion being planar and convexed respectively.

4. A battery pack comprising:
    a first case including a first lid, a first cell receiving portion for receiving and supporting first and second battery cells, and a first connecting portion for connecting the first cell receiving portion with said first lid, wherein said first and second battery cells are arranged physically in parallel and connected electrically in series to each other, said first lid includes a pair of first apertures formed at an upper surface thereof, a pair of second apertures formed at a side surface of said first lid, and a pair of third apertures located below the second apertures, and a pair of terminal member supporting portions having recesses for connecting the first apertures with the second apertures, and said first lid, the first cell receiving portion, and the first connecting portion are integrally formed;
    a second case including a second lid engaged with said first lid, a second cell receiving portion for receiving and supporting said first and second battery cells by engagement with the first cell receiving portion, and a second connecting portion for connecting the second cell receiving portion with said second lid, wherein said second lid, the second cell receiving portion, and the second connecting portion are integrally formed; and
    first and second terminal members each having a connecting end inserted through one of the first apertures to be electrically connected with one of electrodes of said first and second battery cells, and a fixing end inserted through one of the second apertures, wherein the fixing ends of said first and second terminal members are inserted into the third apertures via the second apertures to be fixed to said first case, and said first and second terminal members are located on the terminal member supporting portions.

5. A battery pack according to claim 4, wherein said first case has a planar W-like shape, said first and second cases cover a space between said first and second battery cells and expose outer side surface portions of said first and second battery cells.

6. A battery pack according to claim 4, wherein radii of a curvature of arcuate portions of said first lid and the first cell receiving portions is equal to a radius of said first and second battery cells, outside and inside surfaces of the first connecting portion being concaved and convexed respectively, and outside and inside of the second connecting portion being planar and convexed respectively.

7. A battery pack comprising:
    a first case including a first lid, a first cell receiving portion for receiving and supporting first and second battery cells, and a first connecting portion for connecting the first cell receiving portion with said first lid, wherein said first and second battery cells are arranged physically in parallel and connected electrically in series to each other, said first lid includes a pair of first apertures formed at an upper surface thereof, and vertical fixing recesses located at a side surface of said first case, and a pair of terminal member supporting portions having recesses for connecting the first apertures with the fixing recesses, and said first lid, the first cell receiving portion, and the first connecting portion are integrally formed;
    a second case including a second lid engaged with said first lid, a second cell receiving portion for receiving and supporting said first and second battery cells by engagement with the first cell receiving portion, and a second connecting portion for connecting the second cell receiving portion with said second lid, wherein said second lid, the second cell receiving portion, and the second connecting portion are integrally formed; and first and second terminal members each having a connecting end inserted through one of the first apertures to be electrically connected with one of electrodes of said first and second battery cells, and a fixing end inserted through one of the vertical fixing recesses to be fixed to said first case, and said first and second terminal members are located on the terminal member supporting portions.

8. A battery pack according to claim 7, wherein said first case has a planar W-like shape, and said first and second cases cover a space between said first and second battery cells and expose outer side surface portions of said first and second battery cells.

9. A battery pack according to claim 7, wherein radii of a curvature of arcuate portions of said first lid and the first cell receiving portions is equal to a radius of said first and second battery cells, outside and inside surfaces of the first connecting portion being concaved and convexed respectively, and outside and inside of the second connecting portion being planar and convexed respectively.

* * * * *